(12) United States Patent
Garcia

(10) Patent No.: US 12,300,223 B2
(45) Date of Patent: May 13, 2025

(54) SUPPORT FOR SYNTAX ANALYSIS DURING PROCESSING INSTRUCTIONS FOR EXECUTION

(71) Applicant: SAP SE, Walldorf (DE)

(72) Inventor: Marcos Del Puerto Garcia, Walldorf (DE)

(73) Assignee: SAP SE, Walldorf (DE)

( * ) Notice: Subject to any disclaimer, the term of this patent is extended or adjusted under 35 U.S.C. 154(b) by 576 days.

(21) Appl. No.: 17/646,949

(22) Filed: Jan. 4, 2022

(65) Prior Publication Data

US 2023/0274734 A1 Aug. 31, 2023

(51) Int. Cl.
*G10L 15/18* (2013.01)
*G06F 40/211* (2020.01)
*G06F 40/284* (2020.01)

(52) U.S. Cl.
CPC ........ *G10L 15/1822* (2013.01); *G06F 40/211* (2020.01); *G06F 40/284* (2020.01)

(58) Field of Classification Search
CPC ... G10L 15/1822; G06F 40/211; G06F 40/284
USPC ......................................................... 704/257
See application file for complete search history.

(56) References Cited

U.S. PATENT DOCUMENTS

| | | | | |
|---|---|---|---|---|
| 6,434,529 | B1 * | 8/2002 | Walker ................ | G10L 15/1822 704/275 |
| 8,826,240 | B1 * | 9/2014 | Lachwani ................ | G06F 8/30 717/130 |
| 9,471,466 | B1 | 10/2016 | Garcia et al. | |
| 9,641,608 | B2 | 5/2017 | Garcia et al. | |
| 10,418,036 | B1 * | 9/2019 | Roturier ............... | G10L 15/1822 |
| 10,437,572 | B1 * | 10/2019 | Ghaleb ................. | G06F 40/284 |
| 10,446,147 | B1 * | 10/2019 | Moniz ................... | G06F 3/167 |
| 10,579,794 | B1 * | 3/2020 | Gates .................... | G06F 3/0604 |
| 11,200,227 | B1 * | 12/2021 | Viswanathan .......... | G06F 40/30 |

(Continued)

OTHER PUBLICATIONS

Wikibooks.org [online], "Introduction to Programming Languages/ Grammars" created on Jun. 2012, [retrieved on Nov. 24, 2021], retrieved from : URL <https://en.wikibooks.org/wiki/Introduction_to_Programming_Languages/Grammars>, 2 pages.

(Continued)

*Primary Examiner* — Thuykhanh Le
(74) *Attorney, Agent, or Firm* — Fish & Richardson P.C.

(57) ABSTRACT

The present disclosure relates to computer-implemented methods, software, and systems for data processing of instructions requested for execution at a given version of a software system or application. One example method includes defining rules for processing instructions at a syntax analyzer of an application. The rules can include hint metadata for evaluating validity statuses of instructions at different versions of the application. An instruction that includes tokens is receive at the syntax analyzer to determine whether a token sequence corresponds to a rule from the rules. In response to determining that the token sequence corresponds to the rule and the rule is inactive for a current version of the application associated with the syntax analyzer, a second version of the application can be determined that is associated with the corresponding rule as an active rule. An indication of the second version of the application can be provided.

20 Claims, 5 Drawing Sheets

(56) References Cited

U.S. PATENT DOCUMENTS

| | | | | |
|---|---|---|---|---|
| 11,341,323 | B1* | 5/2022 | Donahue, III | G06Q 50/184 |
| 11,379,102 | B1* | 7/2022 | Brannam | G06F 8/658 |
| 11,630,775 | B2* | 4/2023 | Ataras | G06F 12/084 |
| | | | | 707/814 |
| 2005/0033582 | A1* | 2/2005 | Gadd | G10L 15/26 |
| | | | | 704/E15.04 |
| 2007/0192084 | A1* | 8/2007 | Appleby | G06F 40/45 |
| | | | | 704/9 |
| 2010/0318356 | A1* | 12/2010 | Hamaker | G10L 15/19 |
| | | | | 704/E15.005 |
| 2011/0258177 | A1* | 10/2011 | Wu | G06F 40/284 |
| | | | | 707/711 |
| 2012/0110444 | A1* | 5/2012 | Li | G06F 40/157 |
| | | | | 715/709 |
| 2015/0142443 | A1* | 5/2015 | Hwang | G06F 40/211 |
| | | | | 704/257 |
| 2015/0154174 | A1* | 6/2015 | Hoover | G06F 40/211 |
| | | | | 704/9 |
| 2017/0091190 | A1* | 3/2017 | Attias | G06F 16/90344 |
| 2017/0169817 | A1* | 6/2017 | VanBlon | G10L 15/02 |
| 2017/0256256 | A1* | 9/2017 | Wang | G10L 15/30 |
| 2017/0322934 | A1* | 11/2017 | Chen | G06F 9/50 |
| 2017/0352352 | A1* | 12/2017 | Wang | G06F 3/167 |
| 2018/0096681 | A1* | 4/2018 | Ni | G10L 15/063 |
| 2019/0098402 | A1* | 3/2019 | Zhang | G01S 5/20 |
| 2020/0119920 | A1* | 4/2020 | Kohli | H04L 9/0866 |
| 2020/0125751 | A1* | 4/2020 | Hariharasubrahmanian | |
| | | | | H04L 9/3247 |
| 2020/0184013 | A1* | 6/2020 | Ilic | G06F 40/258 |
| 2020/0242251 | A1* | 7/2020 | Wisgo | G06F 21/564 |
| 2020/0294506 | A1* | 9/2020 | Ward | G10L 15/1822 |
| 2020/0356349 | A1* | 11/2020 | Jain | G10L 15/22 |
| 2020/0366709 | A1* | 11/2020 | Rodniansky | H04L 63/1466 |
| 2021/0011957 | A1* | 1/2021 | Lenzner | G06F 16/9566 |
| 2021/0050008 | A1* | 2/2021 | Ward | G10L 15/22 |
| 2021/0072970 | A1* | 3/2021 | Gupta | G06Q 20/202 |
| 2021/0090730 | A1* | 3/2021 | Patel | A61M 5/142 |
| 2021/0151035 | A1* | 5/2021 | VanBlon | G10L 15/26 |
| 2021/0350252 | A1* | 11/2021 | Alexander | G06F 16/906 |
| 2022/0019524 | A1* | 1/2022 | Ramachandran | G06F 11/3696 |
| 2022/0046022 | A1* | 2/2022 | Fox | H04L 63/101 |
| 2022/0093087 | A1* | 3/2022 | Nie | G10L 15/18 |
| 2022/0122607 | A1* | 4/2022 | Halstvedt | G06F 3/167 |
| 2022/0129095 | A1* | 4/2022 | Seering | G06F 8/38 |
| 2022/0197632 | A1* | 6/2022 | Cg | G06F 8/71 |
| 2022/0215106 | A1* | 7/2022 | Brooks | G06F 21/629 |
| 2022/0291914 | A1* | 9/2022 | Prasanna | G06F 40/253 |
| 2022/0301034 | A1* | 9/2022 | Tezuka | G06F 11/36 |
| 2023/0061613 | A1* | 3/2023 | Cardozo | G06F 8/71 |
| 2023/0185899 | A1* | 6/2023 | Bendanan | G06F 21/6227 |
| | | | | 726/23 |
| 2023/0206912 | A1* | 6/2023 | Piersol | G10L 15/22 |
| | | | | 704/232 |

OTHER PUBLICATIONS

Wikipedia.org [online], "Backus-Naur Form" created on Jul. 2002, [retrieved on Nov. 24, 2021], retrieved from : URL <https://en.wikipedia.org/wiki/Backus%E2%80%93Naur_form>, 9 pages.

Wikipedia.org [online], "Compiler" created on Oct. 2001, [retrieved on Nov. 24, 2021], retrieved from : URL <https://en.wikipedia.org/wiki/Compiler>, 8 pages.

Wikipedia.org [online], "Finite-State Machine" created on Aug. 2001, [retrieved on Nov. 24, 2021], retrieved from : URL <https://en.wikipedia.org/wiki/Finite-state_machine>, 8 pages.

Wikipedia.org [online], "GNU Bison" created on May 2002, [retrieved on Nov. 24, 2021], retrieved from : URL <https://en.wikipedia.org/wiki/GNU_Bison>, 7 pages.

Wikipedia.org [online], "Interpreter (Computing)" created on Jun. 2002, [retrieved on Nov. 24, 2021], retrieved from : URL <https://en.wikipedia.org/wiki/Interpreter (computing)>, 6 pages.

Wikipedia.org [online], "Lexical analysis" created on Sep. 2002, [retrieved on Nov. 24, 2021], retrieved from : URL <https://en.wikipedia.org/wiki/Lexical_analysis#Token>, 6 pages.

Wikipedia.org [online], "Parsing" created on Sep. 2003, [retrieved on Nov. 24, 2021], retrieved from : URL <https://en.wikipedia.org/wiki/Parsing>, 5 pages.

Wikipedia.org [online], "Formal Grammar" created on Aug. 2001, [retrieved on Nov. 24, 2021], retrieved from : URL <https://en.wikipedia.org/wiki/Formal_grammar>, 6 pages.

* cited by examiner

SUPPORT FOR SYNTAX ANALYSIS DURING PROCESSING INSTRUCTIONS FOR EXECUTION

TECHNICAL FIELD

The present disclosure relates to computer-implemented methods, software, and systems for data processing.

BACKGROUND

Software complexity is increasing and causes changes to lifecycle management and maintenance of software applications and platform systems. Software applications and systems can provide services and access to resources. Different versions of applications and systems are continuously provided to improve or replace functionality of previous versions. For example, customers' needs are transforming, with increased requirements for flexibility and efficiency in terms of processes and service flexibility. The learning process for onboarding customers to new functionality can be cumbersome.

SUMMARY

Implementations of the present disclosure are generally directed to computer-implemented method for data processing of instructions requested for execution at a given version of a software system or application.

One example method may include operations such: defining rules for processing instructions at a syntax analyzer of an application, wherein the rules include hint metadata for evaluating validity statuses of instructions at different versions of the application; receiving an instruction including tokens at the syntax analyzer to determine whether a token sequence corresponds to a rule from the rules; and in response to determining that i) the token sequence corresponds to the rule and ii) the rule is inactive for a current version of the application associated with the syntax analyzer: determining a second version of the application that is associated with the corresponding rule as an active rule; and providing an indication of the second version of the application.

In some instances, the second version of the application is associated with executable capabilities for executing a command defined based on the instruction.

In some instances, the instruction can be provided as a string of symbols written in at least one format selected from the group consisting of a natural language, a programming language, and a data structure.

In some instances, the instruction can be a voice instruction received in an audio format, and the method can include: parsing the instructions based on voice recognition to identify the tokens within the voice instructions.

In some instances, the provided indication can further include a notification that the received instruction is not executable at the current version due to a restriction defined for the instruction to be executed at the current version. In some instances, the restriction is associated with user or product properties defined for one or more versions of the application.

In some instances, the method can include determining that the token sequence corresponds to the rule comprises determining that at least two tokens of the tokens define a group corresponding to the rule, wherein the at least two tokens are determined to define the group based on a predefined correlation rules for processing a sequence of tokens at the syntax analyzer.

In some instances, the provided indication of the second version includes an annotation that includes at least one of i) information for limitations of executing the instruction at the current version of the application, ii) information how to redefine the instruction to provide a new instruction in an executable format for the current version of the application, and iii) an indication of the second version of the application as a relevant version for executing the instruction without changes.

In some instances, the information how to redefine the instruction to provide the new instruction in the executable format comprises: providing a clue annotation to perform at least one of redefining operation for the instructions from the group consisting of modification, replacement, and extension of the received instruction to define the new instruction that is executable at the current version of the application.

In some instances, the method can further include: receiving an identification of a user associated with the received instructions; determining whether the rule that corresponds to the token sequence is associated with a clue indication that defines restrictions for executing the rule at the current version of the application by the user; and providing information indicative of the restriction.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 5 is a schematic illustration of example computer systems that can be used to execute implementations of the present disclosure.

DETAILED DESCRIPTION

Figure 1:
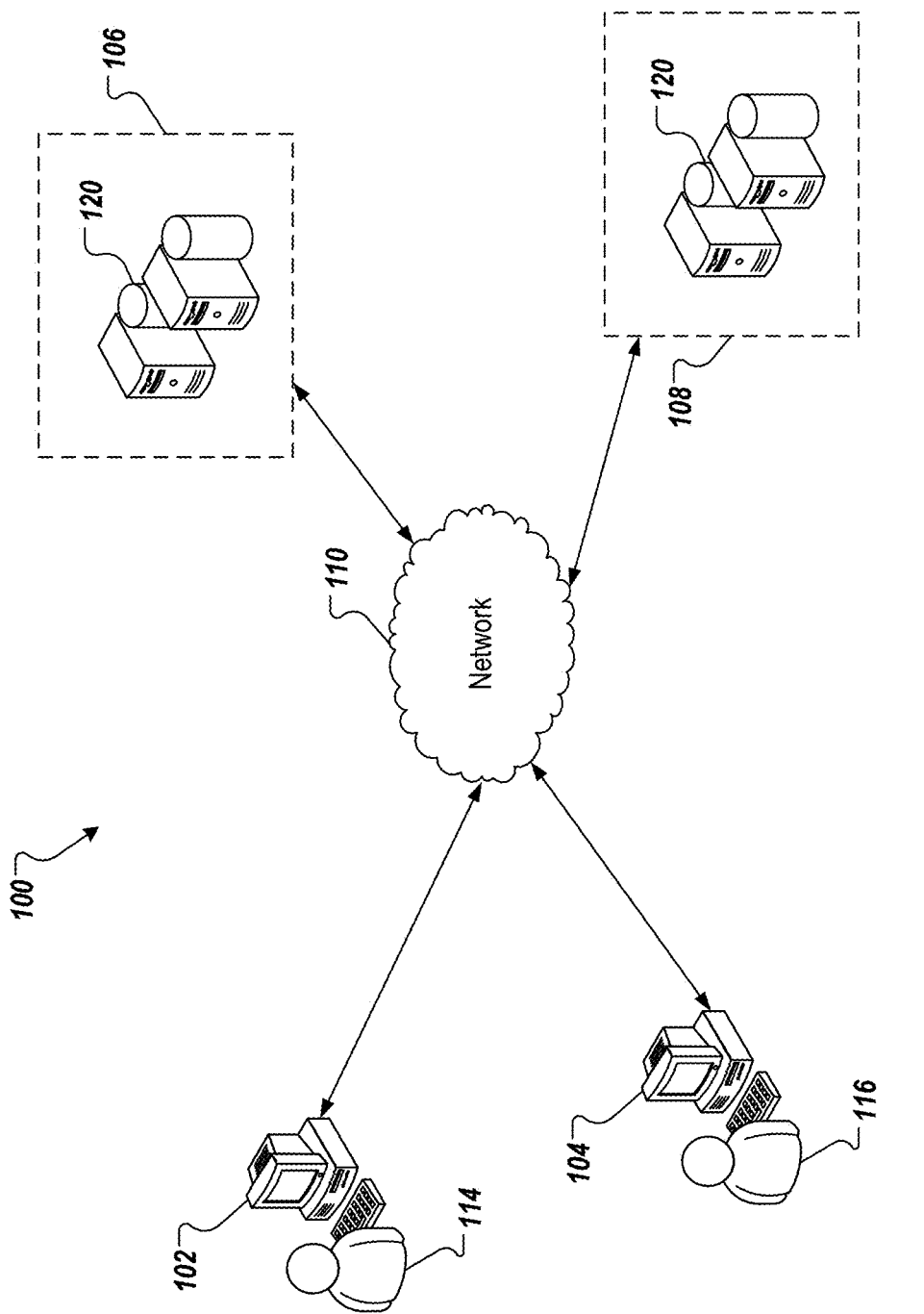
FIG. 1 depicts an example system that can execute implementations of the present disclosure.

The present disclosure describes various tools and techniques for data processing of instructions requested for execution at a given version of a software system or application.

In some instances, software product development includes defining multiple versions of software applications, products, or systems that can have extended and/or varying functionalities. In some instances, different versions of a software product can be associated with respective, and possibly different, sets of supported features. Some of those sets of supported features may overlap with one another, while some features may not be available in older versions, while legacy features may not be available in newer versions. For example, a software application (e.g., a stand-alone software tool, a product including software services, or other suitable software tool) can be developed and released in versions to coordinate installation, upgrades, and available interfacing with other software, among other examples. Different versions of the application may provide different functionalities and/or features (e.g., services and interfaces for interaction with the application). In some instances, the functionalities of a given version can be a subset of the functionalities of a subsequent version. In some other instances, the functionalities of a given version can only be partially inherited by a subsequent version.

In some instances, versions of a software application or product can be associated with corresponding sets of features that are available to be invoked by users and/or other software applications or products. In some instances, an instruction to invoke a certain functionality can be defined according to a predefined syntax to request an operation associated with the provided functionality. For example, a software application similar to a personal assistant software can provide alarm services, where an alarm can be requested to be set. In that example, a request can be provided in a natural language format and may be input as "Set an alarm in 2 hours" to the software application. The request can be interpreted based on the alarm service functionalities of a current version of the application, and an alarm can be executed (e.g., scheduled, provided to another related clock service, etc.) according to the defined request.

In some instances, a request to execute an operation associated with provided features and/or functions of a software application or product can be defined in different forms. For example, the request can be defined as a command in a natural language, in a computer language, and/or a data structure. In some instances, the request can be sent to an interpreter application that can translate the request as one statement (e.g. in form of an instruction in a natural language) into machine code. In those examples, the request can be received as a voice command, a gesture, a written string, or a combination thereof, among other examples of input received by an interpreter application or product to request execution of operations. In some other instances, the request can be source code related to a version of a software application, where the source code is provided for compilation at a compiler (or compiler application). The source code can be parsed and translated by the compiler into executable code (e.g., binary files). In some instances, the source code can be related to a request at the compiler to compile a new software application, or to compile code related to a different version of the software application.

In some instances, features that are provided by a given version of a software application (e.g., an interpreter application, a running software service available to parse requests) can be invoked by sending requests or commands. To invoke a certain operation (e.g., part of functionality or features provided by a software application or product) with a given request (or command or instruction), the request can be defined according to a language (e.g., an interpretative or a command language) for requesting the operation to be able to properly request and execute the operation. The language can be defined according to a syntax or scheme in which a sequence of words and morphemes can be combined to form a large unit (e.g., phrase and/or sentence) that can be processed by a syntax analyzer based on defined rules in a grammar of the language and translated to executable code that can be provided to a computing machine for execution.

In some instances, a variety of version numbering schemes can be created to keep track of different versions of a software application or product. Each version of a software application or product can be associated with supported functionalities and/or features, where such functionalities and/or features can be invoked based on different requests. In some instances, different versions of a software application or product can be associated with a different grammar for processing received requests/commands, such as where grammar is modified between different versions. In some instances, one or more rules in the grammar of a language supported by one version of the software application or product may not be valid for another version of the software application (respectively not defined in the grammar of the language supported by the other version of the software application). In some instances, rules associated with the software application or product may be defined with validity statuses for different versions of the software application or product. Such statuses can be evaluated when processing a request (e.g., instruction or command) that is directed to a particular version of the software application or product.

In some instances, functionalities and/or features provided by software applications or products can be associated with authorization right for invoking and execution. There can be a set of features that are available only to a subset of the users, for example, those of a particular user role, or part of a user group, among other examples of aggregation of users. In some instances, different functionalities and/or features can be provided according to different authorization schemes to end users of the software application or product. In some instances, a first version of a software application may provide a first set of features to a regular user and a second set of features to a super user. In those instances, a second version of the application may provide a different set of features available to regular users, where such different set of features may at least partially include the first set of features.

In some instances, different versions of software applications can define a scheme for processing instructions or commands that are received from end users and/or from other communicatively coupled software applications or services. In some instances, a command can be received for executing a particular action at a particular version of a software application (e.g., to set up an alarm). In some instances, a request to set up an alarm at two different versions of the software application can be associated with different syntax rules. In those instances, the grammars for the two different versions can be different, and thus, requests that can be processed at one of the versions may be not processed according to the other version. For example, a syntax for invoking a command at a software application (e.g., "Application X" that can be an interpretative application such as a personal assistant) can be defined as (1):

<syntax>::="Application X"<command>, where there can be multiple commands supported at "Applications X" that are associated with different functionalities provided by the software application.

For example, one functionality can be to set an alarm, another can be to play music, and another may be to stream video, among others. The different functionalities can correspond to different commands defined according to a language syntax of the software application. The grammar of the language can describe how to form words (or strings of symbols) according to a language alphabet that are valid according to the language syntax. The grammar can define a set of rules for processing strings according to the language of the software application. Different languages can have different grammar rules. In some instances, different versions of the same application can be associated with different grammars and different rules.

In some instances, after a command is sent for processing at a first version of a software application, the command can be processed to determine whether it complies with the syntax of the language of this first version of the software application. If the command does not conform to the rules of the grammar of the language of the first version of the software application, the command may not be able to be processed. In some of those instances, the command can be determined not to conform to the rules of the grammar because the functionality associated with the command is not supported by the first version of the software application.

In some instances, a command can be determined not to conform to the rules of the grammar of a first version of a software application because the command is not invoked with the expected syntax for this first version of the software application. In some of those instances, the functionality that is intended to be requested with that command may be provided by the first version of the software application, but may be associated with a different syntax for the command to be able to validly invoke the functionality. In some other instances, the functionality that is intended to be requested may be provided by other (e.g., subsequent) versions of the software application. In some other instances, the functionality that is intended to be requested may be provided by the first version of the software application, however, the command should be changed to conform to the syntax that is supported by the first version of the software application. For example, the user may have used the grammar for a second subsequent version of the software application to request execution of a functionality provided by both versions, but functionality that is associated with different grammar rules for requesting the execution.

In some instances, when a command is received at a first version of a software application, the command can be processed and if the command cannot be executed by the first version of the software application (i.e., a syntax error can be identified), an identification for a reason why such execution is not available can be determined. For example, it can be determined that the command is only supported from the second version of the software application, that the command should be modified to comply with the syntax of the first version of the software application, or that the command is not supported by any version of the software application. In some instances, based on evaluation of the received command and knowledge about the availability of functionalities associated with the received command at the first version and/or other versions of the software application, an indication of a possible reason why a command cannot be executed at the first version that can be provided. In some instances, the indication can include a clue, a hint, or a suggestion on how to execute the requested operation. For example, the indication can indicate to either change the version of the software application to a particular other different version(s), or to request the execution of the intended operation by a new command that is modified to comply with the grammar of the language of the first version of the application.

In some instances, a first version of a software application can be embedded with logic for syntax processing of received request to identify whether it is possible to execute the request at the first version of the software application by adjusting the syntax used for defining the request, or by identifying another version of the software application that supports the execution of a request.

In some instances, a command associated with a language of a first version of a software application may be defined in the grammar and associated with metadata that defines available syntax for a corresponding command at another version of the software application. Further, in addition to available syntax for another version of the software application, the command at the first version can be associated with a hint or a clue that identifies how the received command does not correspond to the syntax for such a command at the first version of the software application. In some instances, such a hint or a clue can be derived from the differences of the syntaxes of the command at least two versions of the software application.

An example is provided herein. In one example, multiple versions of a software application named "Home assistant" may be available. The grammar for version 3 of the "Home assistant" can be enhanced to include annotations of other versions of the same application and available functionality, as well as for metadata for identifying a possible option to execute the command, (e.g., at another version of the "Home assistant," as a modification of the command, or other hint or suggestions). In some instances, the enhanced grammar can be defined to include definitions of commands and/or corresponding notations in the form of metadata that indicate the association of a given command with syntax and availability of corresponding commands at other versions of the Home assistant application.

For example, the grammar of version 3 of the "Home assistant" application can include the following:

```
<syntax> ::= "HOME ASSISTANT" <command>
<command> ::= "PLAY" "MUSIC" |
    "SET" "ALARM" "IN" <minutes> |
```

```
##VERSION3#"SET" "ALARM" <day> "AT" <time> |
  ##VERSION4#          ##HINT#VERSION3#Must     specify     day#
##HINT#VERSION2#Operation not available# "SET" "ALARM" "AT" <time>
```

In the example, version 3 of the "Home assistant" application supports the command "SET", however, the command is defined with a different syntax—it must specify the day. Therefore, if a user sends a request to version 3 of the "Home assistant" application as follows: "Home assistant set alarm at 5 pm," the request can be processed and based on the metadata, an indication to the requestor can be provided.

In some instances, the indication can include an identification of what was the cause for the syntax error, and/or can include a suggestion on how to execute the command at either this version of the software application (if possible) and/or at another version of the software application. For example, the indication can be, "The requested operation is not available in version 3 of Home assistant. For this version, you need to specify the day." In another example, the indication can be, "The requested operation is available in version 3 of the 'Home assistant' application. Please upgrade to version 4 of the 'Home assistant' application." In some instances, the provided indications to the user can be based, at least in part, on the metadata that is encoded in the grammar that is used to process the received request at the first version of the software application.

In some other instances, a compiler application can be used to receive source code for different software application versions and to generate executable code that can be run at relevant computer machines, devices, virtual machines, or servers, among other examples. When software code for a given software application version is provided to a compiler application, the software code is processed to determine whether the source code and defined operations can be compiled to generate an executable file. In some cases, the source code cannot be compiled because of instructions in the source code that do not comply with a target component or system that they are directed to. In those cases, errors at compile time can occur. Overcoming (or solving) compilation errors can be addressed in different ways that can depend on the underlying issues and availability of the compiler. For example, such errors can be addressed by modifying the source code to comply with expectations of the compiler and/or the target systems. As another example, a newer version of the compiler can be used that supports the execution of the source code as initially provided.

In some instances, the compiler can be provided with logic for processing received source code for compiling and determining hints and suggestions in cases when the source code cannot compile. The compilation failure can be associated with different errors, including errors in the definition of the source code (e.g., programming language errors), a wrong version of the compiler that does not support and/or allow defined operations in the source code, or else. The compiler can provide hints and suggestions related to identified compiler time errors in a similar manner to the determination of hints and suggestions in the context of interpreter applications (e.g., the "Home assistant", personal assistant) discussed above. In those instances, the compiled can be generated by a parser generator that enhances the compiler's grammar with hint metadata that can support identification of hints and suggestions for errors in the compilation of the received source code.

FIG. 1 depicts an example architecture 100 in accordance with implementations of the present disclosure. In the depicted example, the example architecture 100 includes a client device 102, a client device 104, a network 110, a cloud environment 106, and a cloud environment 108. The cloud environment 106 may include one or more server devices and databases (e.g., processors, memory). In the depicted example, a user 114 interacts with the client device 102 and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provide such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

In some instances, hosted applications running at the cloud environment 106 may be provided with logic for processing requests and identifying why at least some of the received request are identified as including a syntax error when processed. In some instances, the application version can also provide an indication for fixing or solving the issues related to the provided request based on metadata enhancements to the grammar supported by the application version. In those instances, where a request is associated with a syntax error, an identification of how to modify the request or identify a different version of the software application that can execute the intended functionality can be provided. The errors for executing such requests can be determined at runtime. Hints and suggestions on how to address identified errors at runtime can be provided (e.g., to end users). Addressing the errors can be performed from a different view rather than from making changes at the running instance. For example, a user using the application can modify the request, or in another example, the software developer or provider of the application can modify the application to allow the user to request again and to successfully perform the requested operation. In some cases, requests of the users can be modified based on provided hints, suggestions, or clues as previously discussed. In the example of upgrading the software application, the source code of the software application can be modified (or upgraded) to recompile the application where the new version of the application can support features that can process the request of the user without modifications.

Figure 2A:
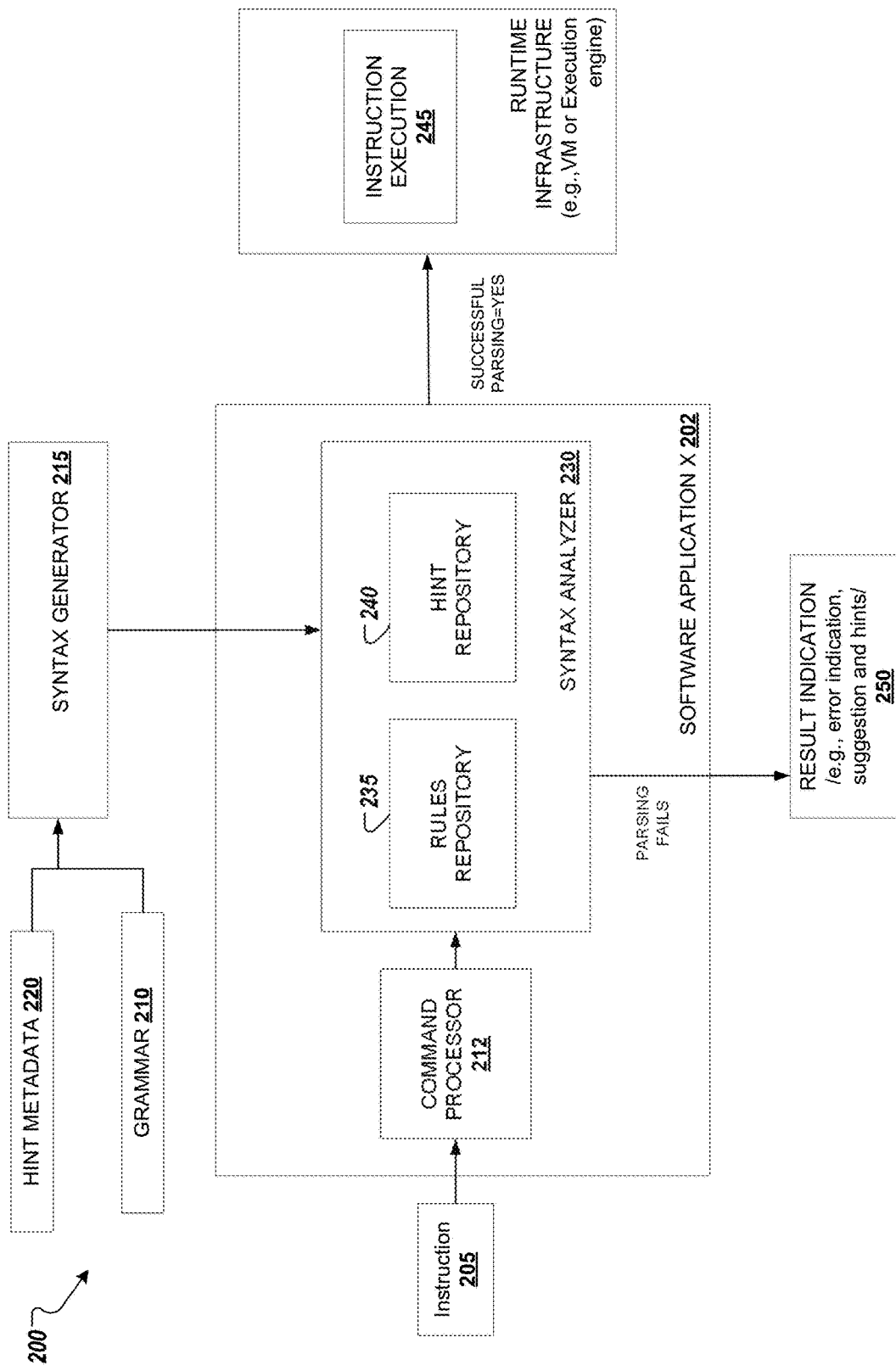
FIG. 2A is a system diagram of an example system 200 including a syntax analyzer 230 to interpret received instructions and execute corresponding operations in accordance with implementations of the present disclosure.

FIG. 2A is a system diagram of an example system 200 including a syntax analyzer 230 to interpret received instructions and execute corresponding operations in accordance with implementations of the present disclosure.

In some instances, a software application X 202 (e.g., "Home assistant" as previously discussed) can provide different functionalities and can serve requests received from users and/or other software applications or services. In some instances, received requests can be interpreted as input for requesting an execution of a certain operation by the software application (e.g., the software application can be identified with a particular version). In some instances, the received request can also identify a target version of a software application for execution of the operation. In some instances, a request to execute an operation at the software application X can be provided in various forms of input. For example, the request can be a voice command or a typed command, as well as other suitable options for providing instruction requests to a software application.

In some examples, the request can be directed to a desired (or target) version of a software application for executing a request. In some of those instances, the request for executing an operation can be in the context of a real-time use case scenario of a user using the version of the software application in productive mode. In some other instances, the request can be evaluated to test and compare available functionalities of different versions of the same application. In some instances, when a request is received it can be processed based on logic for processing requests associated with a target version of the software application. In some instances, the request can be processed at runtime by a command processor 212 (e.g., lexical analyzer) to determine tokens within the received instruction. In some instances, the instruction 205, when provided to the software application X 202, is processed at a command processor 212. The command processor 212 can include logic of a lexical analyzer that can read the received instruction and identify strings that form words and/or phrases and sentences. The command processor 212 can identify words that are terms defined as tokens, where such tokens can be associated with a language, for example, the supported language of the version 1 of the software application X 202. In some instances, a token can be defined as a delimited element (e.g., a word) in association with a category of the word (e.g., literal, number, symbol, and special character, among others).

In some instances, the tokenized instruction can be provided to a syntax analyzer 230 (or parser) to parse the instruction by interpreting the instruction according to the grammar of the software application. The instruction can be interpreted according to the version of the software application and if it is successfully parsed, it can be executed 245 at runtime.

In some instances, when the tokenized instruction is received at the syntax analyzer 230, the syntax analyzer 230 interprets the tokens based on the language defined for the syntax analyzer 230. The syntax analyzer 230 can implement a behavior model to determine how to process received requests.

In some instances, when a request is provided as input to a software application X 202, the request is processed based on the implemented behavior model at the software application X 202. In some instances, the software application X 202 can be one of multiple versions in which the software application X 202 is provided. In some instances, different versions of the software application X 202 can support different functionalities and can correspondingly be associated with different logic for parsing requests. In some instances, requests for execution of operations at the software application X 202 can be processed based on a language (e.g., natural language, command language, interpretative language, etc.) supported by the version 1 of the software application X. The language can be based on a grammar 210 that is defined for the version 1 of the software application X 202. In some instances, the grammar 210 can be enhanced with hint metadata 220 that can be integrated into the definition of the grammar 210 to provide information for available commands in other versions of the software application that corresponds to defined commands defined in the grammar 210.

In some instances, the syntax analyzer 285 can provide a behavior model by inputting the hint metadata 220 and the grammar 210 into a syntax generator 215. The syntax analysis that can be performed enhances the interpretation by providing information (e.g., hints, suggestions, or indication of other versions of the software application X 202) that can be used in cases where a received instruction cannot be successfully analyzed and thus cannot be executed. The grammar 210 can be provided in the form of a grammar specification written according to a specific notation (e.g., Backus-Naur Form (BNF), extended BNF, etc.). The syntax generator 215 can be a tool provided by another software provider or specifically developed and designed for the software application X 202.

In some instances, the syntax analyzer 230 can create state machines or other standard artifacts that can be used for implementation and/or realization of a grammar parser such as the syntax analyzer 230. For example, syntax analysis at the syntax analyzer 230 can be performed using state machines. The syntax analyzer 230 can create the state machines based on the input grammar 210 and the hint metadata 220, where the grammar 210 is converted and stored in a rules repository 235 and the hint metadata 220 is converted into a hint repository 240. In some instances, the rules repository 235 and/or the hint repository 240 can be an external file to the sytnax analyzer 230. The rules defining the language can be associated with the version of the software application X 202. The tokens from the sequence can be processed to determine whether there is a match of one or more subsequent tokens to a rule identified in the rules repository 235.

In some instances, a requested instruction, such as the instruction 205, can be provided for executing an operation(s) and the instruction can be evaluated based on rules (defined at the syntax analyzer 230) that include hint metadata to determine whether the instructions can be processed at the requested version of the software application. In some instances, the instructions can be evaluated to determine their validity status at a current version of the software application and/or at another version of the software application. In some instances, if one instruction is valid for only one version of the application (e.g., corresponds to the rules of the syntax analyzer 230 associated with that version), the validity status of the instruction for this version of the application can be determined as valid and the instructions can be processed (e.g., interpreted or compiled). In those instances, that instruction can be evaluated to have an invalid status for another version of the application where such instruction cannot be processed successfully (e.g., there is not rule defied for the other version of the application that corresponds to the instruction). In some instances, instructions that are not valid for one or more versions of the application can be associated with hint information (or metadata) that identify other versions of the application where such instructions are associated with a valid status. In some instances, the hint information can also include further information related to modifications of the instructions to generate an instruction that can be associated with a valid status.

In some instances, if tokens identified from the instruction 205 correspond to an existing rule, the instruction 205 is provided to be executed at 245. In some other instances, based on the identified tokens that comply with an existing rule in the rules repository 235, an abstract syntax tree can be generated as an intermediate representation of a program code. In some instances, the generated executable instruction (e.g., executable code, syntax tree, or else) can be provided to a processor for execution at 245.

In some other instances, if tokens identified from the instruction 205 do not correspond to an existing rule at the rules repository 235, a syntax error can be identified for the instruction 205. When a received instruction has a syntax error, the instruction is invalid and cannot be compiled and executed at a processor (runtime execution 245 cannot be performed). In some instances, after a user provides an invalid instruction, the XYZ can provide the user with suggestions or hints how to accomplish such execution at another version of the software application X, at the present version of software application X (e.g., by requesting the instruction according to the supported syntax by the version), or with suggestions or hints to try other tools that can be predefined in the metadata stored together with the rules of the grammar at the rules repository 235, and a hint repository 240.

In some instances, the performed syntax analysis at the syntax analyzer 230 can be implemented to read a token from the input tokenized instruction from the command processor 212 and call a handler for a current state. The processing of the token at the handler either lead to determining an instruction as defined in the grammar 210, or determining an error. Once a token is determined to correspond to an instruction, the state is changed to another state and a subsequent token is read by the handler. The token can be read one by one and states can be correspondingly changed. Once a command in the grammar is determined based on a subsequent list of tokens part of the instruction, the command can be executed at 245. The execution of the instruction can be successfully performed if the software application X 202 has a version that corresponds to the version identified for the command in the hint repository 240. If the version is different, then a relevant hint from the hint repository can be determined and provided as a result indication 250.

For example, an example software application X 202 can be a simple home assistant application having the syntax analyzer 230 based on the grammar and syntax, as defined in Table 1 below.

TABLE 1

<syntax> ::= "ALEXA" <command>
<command> ::= "PLAY" "MUSIC" |
VERSION3# "SET" "ALARM"

In the context of the above example grammar, the software application X 202 is activated with a token that corresponds to "ALEXA." The grammar further defined a command "PLAY MUSIC" and also a command "SET ALARM" that is available only in Version 3. The last line of Table 1 identifies the hint repository 240 for the syntax analyzer 230 in this example.

The syntax analyzer can perform processing according to state machine implementation as presented in the process defined in Table 2.

TABLE 2 handler for state 0:
if you get the token "ALEXA" change to state 1
if not display syntax error
handler for state 1:
if you get the token "PLAY" change to state 2
if you get the token "SET" change to state 4
if not display syntax error
handler for state 2:
if you get the token "MUSIC" we have identified command PLAY MUSIC, go to next
step (e.g., execute)
if not display syntax error
handler for state 4:
if you get the token "ALARM" we have identified command SET ALARM,
check if we are working in mode VERSION3, if so go to next step (e.g., execute)
otherwise check if there is a hint for the version we are working on
  if there is a hint display the hint
  otherwise say it is first available with version 3
if not -> display syntax error In some instances, a feature, such as setting up an alarm, can be provided by the software application X 202, "Version 3." In those instances, there may be other versions of the software application X that do not support the functionality to set up an alarm. In other instances, multiple versions may support the same feature, but the syntax as defined within the grammar for requesting the execution of a certain feature may vary between versions of an application.

In some instances, a feature (e.g., to set an alarm) can be available for multiple versions of a software application, but to request the execution of the feature, different commands may be necessary to be provided to validly request the execution of an operation to perform the feature. For example, a command to set an alarm at version 3 of the software application X 202 can be defined in the language as "SET ALARM", while for version 3, the command may be defined as "SET ALARM AT <DAY> <TIME>". Thus, different versions of one application may have diverse language grammar even if they support similar functionality, such as setting up an alarm. In those cases, one functionality can be implemented in two different command syntaxes.

In some instances, when different versions of a single application have different grammar and syntax for requesting execution of operations related to provide functionality, a user of one version may provide, as a request, an instruction in the format expected for another version. For example, the user may be unaware of the expected syntax for executing a command for the version with which they are interacting. In other examples, the user may be using a certain version of the software application in a testing phase to identify those commands that are available for a newest version of the application and are supported by an earlier version of the application. For example, the user may perform testing activities in the context of identifying functionality to be down-ported to a lower version of a software application.

In some instances, when a user and/or other application sends an instruction 205 to version 3 of the software application X 202, the version 3 of software application X 202 has processing logic that can analyze the request and execute a corresponding operation at 245, where such execution can be at a computer processor of the software application X 202 or other running instances (e.g., virtual machine, device, server, etc.). In other instances, the syntax analyzer may determine that the parsing of the tokenized instruction from the command processor 212 is associated with an issue (e.g., syntax error) related to the requested instruction 205 that does not allow the execution of the instruction 205.

Figure 2B:
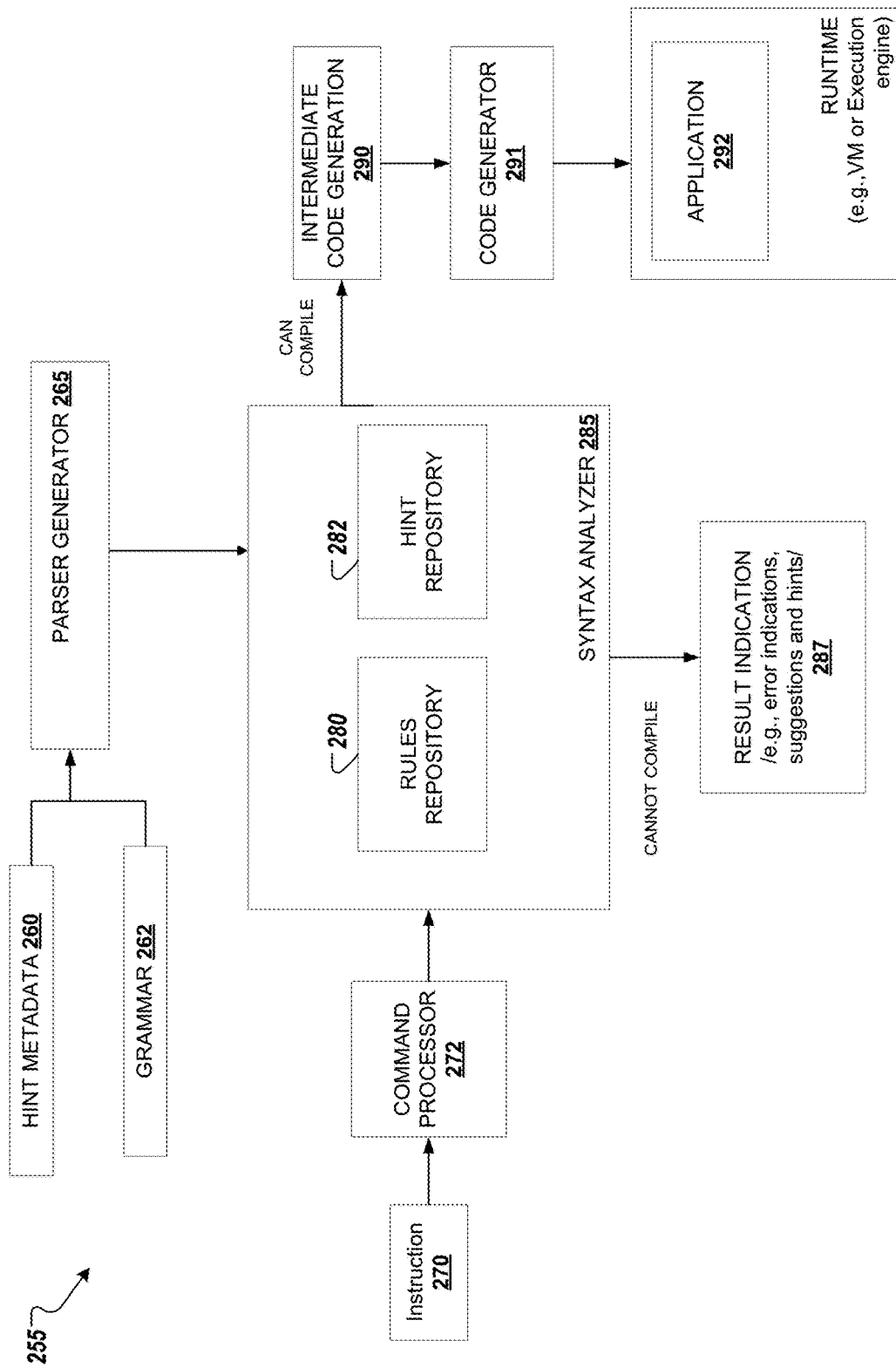
FIG. 2B is a system diagram of an example system 255 including a syntax analyzer 285 to compile received instructions defined as source code in accordance with implementations of the present disclosure.

FIG. 2B is a system diagram of an example system 255, including a syntax analyzer 285 to compile received instructions defined as source code in accordance with implementations of the present disclosure. In some instances, the syntax analyzer 285 may correspond to the syntax analyzer 230 of FIG. 2A in the context of including enhanced logic of a rules repository 280 and a hint repository 282 that can substantially correspond to the rules repository 235 and the hint repository 240 of FIG. 2A. The syntax analyzer 285 can be implemented based on a parser generator 265 that may substantially correspond to the syntax generator 215 and based on input hint metadata 260 and grammar 262 as described in FIG. 2A.

In some instances, the syntax analyzer 285 is provided in the context of a compiler application that received as instruction 270 source code that is provided for compilation and to generate intermediate code 290 that can be subsequently executed at runtime 292. When the code is compiled, compilation errors can arise that may be due to issues in the formulation of the source code, unsupported functionality at the compiler version, unavailability for execution of requested operation as defined inappropriately for a target system (e.g., syntax errors to call a separate system, authentication and security restrictions, etc.).

The command processor 272 can be similar to the command processor 212 and can be included in the compiler, or externally, as an external component that is communicatively coupled to the compiler application. In some instances, the command processor 272 is configured to read received input and identify words or tokens within the received input that can be matched to rules in the rules repository 280 of the syntax analyzer 285 that performs the compilation of the source code to generate intermediate code 290 as an executable.

In some instances, the syntax analyzer 285 is enhanced with rules and additional metadata associating the rules that correspond to the version of the compiler and/or the target system associated with the source code from the instruction 270. In some instances, the compiler can include the syntax analyzer 285 that includes a hint repository 282 with hints, clues, or suggestions that can be provided when compiling the source code. The hint repository 282 can be similar to the hint repository 282 and may include annotations related to the rules of the grammar. The rules of the grammar are applied when executing the compilation. In some instances, if a received instruction does not comply with any grammar rule, then the instruction may be associated with a syntax error. Even if a syntax error is identified, the received instruction can be evaluated based on hints related to grammar rules that can hint into a reason or a suggestion on how to be able to fix the issue in a way that is supported by the compiler (or by another version of the compiler) to lead to a successful compilation result. In some instances, when the source code provided for compilation cannot be compiled based on the syntax analyzes of the syntax analyzer 285, the syntax analyzer 285 as enhanced with the hint repository can provide result indication 287 that include hints, clues, or suggestions that can be provided for addressing the issue to compile the source code. For example, an indication to move to a different version of the compiler can be provided, or an indication how to adjust the source code can be provided, among other example suggestions to address the issues and to be able to generate an executable file with the current compiler or with another version of the compiler.

In some instances, the grammar 262 can be associated with hint metadata 220. The grammar 262 with the hint metadata 220 can be used by the parser generator 265 to define grammar rule syntax that is in the form of metadata annotations for the compiler application and corresponding hints for different commands available in the grammar. For example, rules in the grammar can be defined with the following syntax including annotations of versions and hints associated with rules:

rule ::= ( #VERSION ##HINT* ... )

In the following example related to a compiler including the syntax analyzer 285, an example grammar rule syntax with version information and hint annotations can be defined as presented below:

corresponding_constructor ::= ( #VER_1 ##LOOP 'CORRESPONDING' '(' .... ')' )

In the example, #VER_1 indicates that this gramma rule (that is a source code operation) is available at version 1 of the software application. If the compiler is instructed (with input based on a received request) to check if a fragment of code which uses "CORRESPONDING" is compatible with version 1, it can display no warnings. If the compiler is instructed to check if the code is compatible with 0.1 (as an example previous version compared to version 1), the compiler may determine whether this feature is first available with version 1 and a hint that a possible replacement would be using the operation LOOP.

In some other examples, the grammar rule syntax can be defined with hints, as follows:

```
corresponding_constructor ::= ( #VER_752 ##LOOP##MOVE_CORRESPONDING
    'CORRESPONDING' '(' .... ')' )
```

With the example of several hints, if the compiler is instructed to check if the code is compatible with version 0.1, the compiler can determine and/or provide a warning that this feature is first available with version 1 and hint that a possible replacement would be using the operation LOOP and MOVE-CORRESPONDING.

In some instances, once the instruction 270 is received and processed at the syntax analyzer 285, the instruction 270 can be determined to be associated with a rule from the grammar 262 that is in the rules repository 280, however, that rule is not available (or supported) in version 1 of the software application X.

Figure 3:
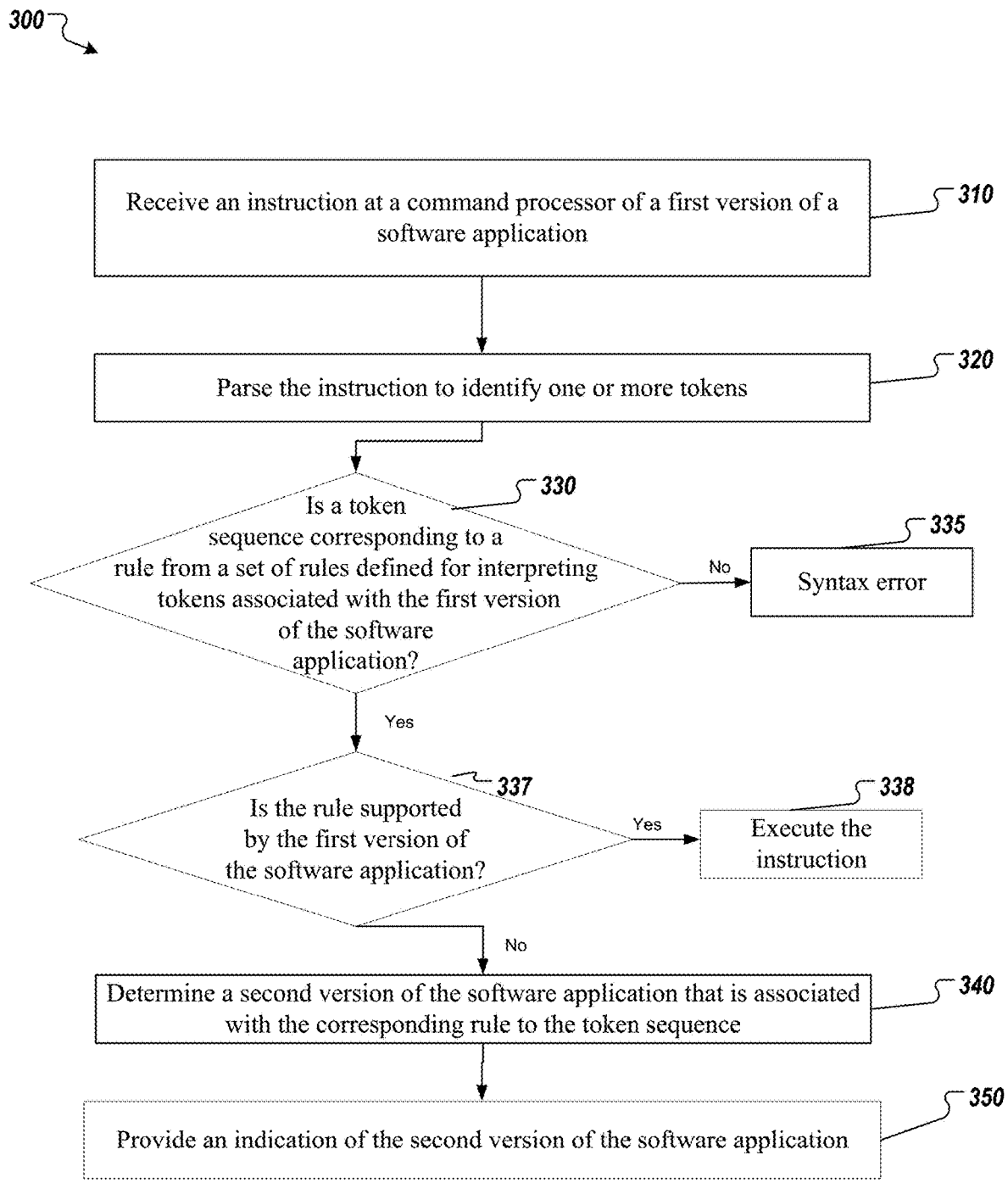
FIG. 3 is a block diagram for an example method for support of processing instructions at a software application of a given version in accordance with implementations of the present disclosure.

FIG. 3 is a block diagram for an example method for support of processing instructions at a software application of a given version in accordance with implementations of the present disclosure. The example method 300 can be implemented at an interpreter application as discussed at FIG. 2A or at a compiler application as discussed at FIG. 2B. The example method 300 can be implemented, in some examples, at the software application X 202, and can be performed by the command processor 210 and the syntax analyzer 230 of FIG. 2. The example method 300 can be implemented, in some examples, at the compiler of FIG. 2B, and can be performed by the command processor 272 and the syntax analyzer 285 of FIG. 2B. The example method 300 can be implemented at a software application that includes enhanced logic for processing requests to identify possible subsequent actions in case a request is executable at a version of a software application (e.g., due to a syntax error in the definition of the instruction).

At 310, an instruction is received at a command processor, such as the command processor 210 of FIG. 2A or command processor 272 of FIG. 2B. In some instances, the instructions are provided as a string of symbols written in at least one format. For example, the format can include a natural language, a computer language, and a data structure, among other examples. The instructions can be provided in written form but also as a voice or gesture instruction. In some instances, the instruction is a voice instruction received in an audio format, where the instruction can be parsed based on voice recognition of tokens within the voice instructions.

At 320, the instruction is parsed to identify one or more tokens.

In some instances, a syntax analyzer can receive the instruction to determine whether a token sequence (including a single or multiple tokens) corresponds to a rule of the grammar of a syntax analyzer that processes the instruction to generate an executable instruction. The lexical processing of the instruction can include determining that at least two tokens of the plurality of tokens define a group corresponding to the rule. For example, an instruction that says "Set an alarm at 5 pm." can be evaluated to include two tokens—set and alarm—that correspond to a rule for a command to schedule an alarm at a predefined time. In some instances, the identified token (from the lexical processing) is evaluated (e.g., at a syntax analyzer such as the syntax analyzer 230) based on predefined correlation rules for processing a sequence of tokens.

At 330, it is determined whether a sequence of identified tokens corresponds to a rule from a set of rules defined for interpreting tokens associated with of the software application. The set of rules can be defined as part of a grammar that is used for implementing a syntax analyzer that can perform the determination at 330. The syntax analyzer can be similar to or different than the syntax analyzer 230 of FIG. 2A and the syntax analyzer 285 of FIG. 2B.

If it is determined that the token sequence does not comply with a rule from the grammar defined for the first version of the software application, a syntax error can be provided as an example indication (e.g., indication 250 of FIG. 2A or 287 of FIG. 2B). In some instances, the result indication 250 or 287 can further include hints, clues, or suggestions to support executing the requested instruction at an available version of the software application that supports the instruction, or by invoking the instruction with a valid instruction request.

In some instances, a valid instruction request can be a request that complies with the rules at version 1 of the software application, or that complies with the rules at a different version of the software application (e.g., an interpreter application, a compiler) that supports execution of an instruction corresponding to the requested instruction (e.g., that is a semantically similar instruction identified based on at least part of the identified tokens in the sequence of tokens).

If, at 330, it is determined that there is a corresponding rule, then method 300 continues at 337, where a further determination is made as to whether the rule is supported by version 1 of the software application. If the rule is supported by version 1 of the software application, then method 300 proceeds to generate executable code (based on the instruction received at 310), and execute the instruction at 338.

In some instances, if it is determined that i) the token sequence corresponds to a rule (at 330) and ii) the rule is inactive or unavailable for version 1 of the software application (at 337), then method 300 continues to determine (at 340) a second version of the software application that is associated with the corresponding rule to the token sequence. The rule can be determined as active for the second version of the software application, where the second version of the software application is different from the first version. In some instances, the rule can be determined as active for multiple versions of the software application. In some instances, the determination of the second version can be performed based on a determination of a closest subsequent version that supports the rule.

In some instances, the second version of the software application can be associated with capabilities to execute a command based on the determined token sequence. In those instances, if the instruction that was received at 310 is provided to the second version of the software application, then the command, when evaluated (according to a similar process to method 300), would be determined to correspond to a rule for interpreting tokens and would be supported by the second version of the software application. In those instances, the instruction, when provided to the second version of the application, would lead to a successful execution of the instruction.

In some instances, in response to determining that the token sequence corresponds to the rule, a determination can be made as to whether the rule is associated with at least one annotation indicating that the rule is in an inactive state for the first version of the software application. For example, a hint can be defined to map available versions for different rules. In some instances, the at least one annotation can define at least one of a suggestion, a hint, or a clue associated with the rule. In some of those instances, the annotations can be part of a hint repository included in the syntax analyzer that processed the token sequence.

In some instances, in response to determining that the token sequence corresponds to the rule (at 330), a determination can be made as to whether the rule is associated with at least one annotation related to the rule in an inactive state for the first version of the software application. In some instances, the rule can be in an inactive state when the rule is not supported by the first version of the software application. The at least one annotation can define at least one of a suggestion, a hint, or a clue associated with the rule.

At 350, an indication of the second version of the software application is provided that identifies the second version as capable of executing or performing the instruction. In some instances, the provided indication can also notify that the instruction is not executable due to a restriction in the version of the software application (e.g., older version of the interpreter application (e.g., Home assistant), older version of a compiler application).

In some instances, the indication provided at 350 can be based on the hint metadata at the hint repository of the syntax analyzer as described at FIGS. 2A and 2B. The hint metadata can be used to determine hints or suggestions for a requested instruction that can support remedying the instruction (by changing the instruction or by changing the version of the software application). In some instances, the hints or suggestions can be used to request the instruction again, for example, in modified form. In some other instances, the hints or suggestions can be used as part of an evaluation of functionalities and capabilities provided by the first version of the application. That evaluation can be in the context of a testing phase of the software application, and can also be associated with a complex integration testing between the software application and other software applications, and a combination of interactions of different applications in different versions.

In some instances, the provided indication of the second version can include an annotation from the at least one annotation defining at least one of suggestions, hints, or clues associated with the rule. In some instances, the annotation can include at least one of i) information for limitations of executing the instruction at the first version of the software application, ii) information how to redefine the instruction to provide it in an executable format for the first version of the software application, and/or iii) an indication of the second version of the software application as a relevant version for executing the provided instruction without changes.

In some instances, and related to the operation at 340, it can be determined that a clue annotation is related to the rule for the version 1 of the software application. In some instances, the rule can be associated with metadata that includes annotations identifying clues identifying a valid syntax of a corresponding rule that is active (or supported) for the first version of the software application. In some instances, the clue annotation can be provided as part of the indication (at 350) to provide further instructions for at least one of modification, replacement, or extension of the received instruction to define a new instruction that is executable at the first version of the software application.

In some instances, in response to determining that the rule is not supported (at 337), for example, as an inactive rule for this particular version, a set of clue indications associated with the first version of the software application can be determined. From the determined set of clue indications, a first clue indication can be determined to correspond to the unsupported rule, and the provided indication (at 350) can provide information indicative of a restriction associated with executing the instruction at the first version of the software application. In some instances, from the identified clue indication, a determination of a difference between the instruction and an expected instruction that would have been valid for the first version of the software application can be determined.

In some instances, the restrictions can be associated with user or product properties defined for one or more versions of the software application of a user associated with the received instruction.

In some instances, the received instruction can be provided with an indication of a user associated with the request. In some instances, when evaluating the rules of the grammar corresponding to the first version of the software application based on the received instruction, a determination can be made as to whether the rule that corresponds to the token sequence is associated with a clue indication that defines restrictions for executing the rule at the first version of the software application by the user. In some instances, information of those restrictions can be provided to the user.

For example, the software application can be a virtual machine manager and a user may request to stop the execution of a virtual machine managed by the first version of the software application. In that example, the user instruction can be evaluated based on rules and version data for the first version of the software application to determine what rules are available and supported for the first version, and to determine whether the command matches the syntax of a valid command defined in the grammar rules. In some instances, the instruction as provided by the user may be a valid instruction as corresponding to an existing rule, and the rule may be supported by the first version of the software application. In some of those instances, however, the rule may be limited to execution only with particular authorization permissions. The authorization restrictions may be user-based. For example, only a user with an administrator role can request to stop the execution of an instruction or operation at a virtual machine. In that example, a received instruction can be evaluated based on authorizations configured for features of the version of the software application.

In some instances, a version of a software application can be evaluated in a testing phase by users who are testers. For example, the version of the software application can be based on an SQL-like language receiving structured requests directed to storing, invoking, and manipulating data. In this example, a tester may not be authorized to compile programs which delete database table content, while developers (a different role than tester) can delete only lines of a table and not the whole table, and administrators (a third distinct role)

can delete whole database tables. In some instances, the divergence of authorization between developers and administrators for execution of deletions of whole database tables can be enforced from a certain version of the software application (e.g., version 4). Therefore, if a user who is a developer works with version 4 of the application and requests to delete a whole database table, that operation would not be allowed. In that case, even if the user complies with the syntax of the grammar, the grammar includes information for authorization to determine whether to allow further processing of the instruction. In those cases, the grammar of version 4 can be enhanced with annotations that provide hints, clues, or suggestions that can identify which versions support a particular feature, or why a particular feature is not authorized or otherwise executable. In the present example, version 4 of the software application can provide an indication to the user to identify that version 4 does not allow users of developer roles to delete whole databases, and that only administrators have these rights. In some instances, a determination of such an indication can be made based on hint metadata that is embedded at the syntax analyzer (e.g., at the hint repository 240 of the syntax analyzer 230). For example, hint annotations can be added to the syntax grammar rules for the version 4 of the software application to allow processing of requests and to provide indications based on the annotations.

In one particular example, a pseudo code for defining grammar rules part of the grammar of version 4 of the above example can include:

```
<pseudosql_command>      :   ##ROLE:DEVELOPER#      ##ROLE:ADMIN#
##HINT#ROLE:TESTER# Only developers are allowed to compile this operation# "DELETE"
<lines> <database_table_name> | "SELECT" ...
<lines> ::= ##ROLE:ADMIN# ##VERSION4# #HINT#ROLE:DEVELOPER#Only developers
are allowed to compile this operation# ##HINT#VERSION#This operation is available to admins
starting with version 4# "ALL"| "LINE" <line_number>|
```

In some instances, the grammar defined for a given version of a software application can be provided with hint annotations related to functionality, availability of functionalities, issues in the instruction syntax of provided instructions, authorization restrictions for execution of instructions at the given version, among other examples of relevant information to be provided as an indication in response to instructions that cannot be executed at the given version of the software application.

Figure 4:
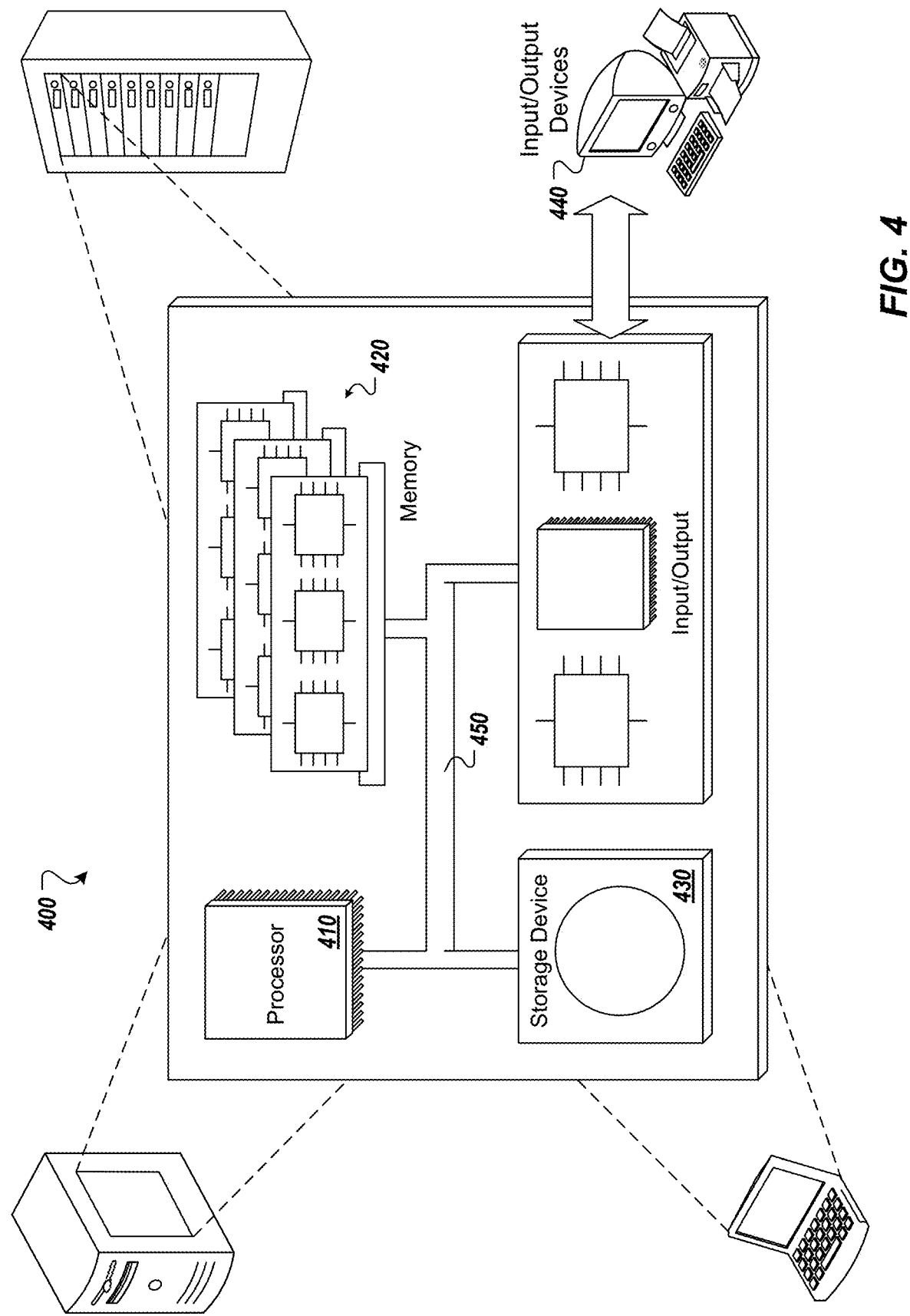
FIG. 4 is a block diagram for an example method for processing, at a syntax analyzer, commands for execution at a software application version in accordance with implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, and 440 are interconnected using a system bus 450. The processor 410 is capable of processing instructions for execution within the system 400. In some implementations, the processor 410 is a single-threaded processor. In some implementations, the processor 410 is a multi-threaded processor.

The processor 410 is capable of processing instructions stored in the memory 420 or on the storage device 430 to display graphical information for a user interface on the input/output device 440.

The memory 420 stores information within the system 500. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a cathode ray tube (CRT) or liquid crystal display (LCD) monitor for displaying information to the user, and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

Examples

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Enhanced Semantic Analysis

Example 1. A computer-implemented method comprising:
  receiving an instruction at a command processor, wherein the command processor is included in a first version of a software application;
  parsing the instruction to identify one or more tokens;
  providing the identified one or more tokens to a syntax analyzer to determine whether a token sequence corresponds to a rule from a set of rules defined for interpreting tokens associated with the first version of the software application; and
  in response to determining that i) the token sequence corresponds to the rule and ii) the rule is inactive for the first version of the software application:
    determining a second version of the software application that is associated with the corresponding rule to the token sequence, wherein the rule is determined as active for the second version of the software application, and wherein the second version is different from the first version; and
    providing an indication of the second version of the software application.

Example 2. The method of Example 1, wherein the second version of the software application is associated with executable capabilities for executing a command defined based on the determined token sequence.

Example 3. The method of Example 1 or 2, wherein the instructions are provided as a string of symbols written in at least one format selected from the group consisting of a natural language, a computer language, and a data structure.

Example 4. The method of any one of the preceding Examples, wherein the instructions are voice instructions received in an audio format, and wherein parsing the instructions includes parsing based on voice recognition of tokens within the voice instructions.

Example 5. The method of any one of the preceding Examples, wherein the provided indication further includes a notification that the instruction is not executable at the first version due to a restriction defined for the instruction to be executed at the first version.

Example 6. The method of any one of the preceding Examples, wherein the one or more tokens are a plurality of tokens, and wherein determining that the token sequence corresponds to the rule comprises determining that at least two tokens of the plurality of tokens define a group corresponding to the rule, wherein the at least two tokens are determined to define the group based on a predefined correlation rules for processing a sequence of tokens at the syntax analyzer.

Example 7. The method of any one of the preceding Examples, wherein in response to determining that the token sequence corresponds to the rule, the method further comprises:
  determining whether the rule is associated with at least one annotation related to the rule in an inactive state for the first version of the software application, wherein the at least one annotation defines at least one of a suggestion, a hint, or a clue associated with the rule,
  wherein the provided indication of the second version includes an annotation from the at least one annotation that includes at least one of i) information for limitations of executing the instruction at the first version of the software application, ii) information how to redefine the instruction to provide it in an executable format for the first version of the software application, and ii) an indication of the second version of the software application as a relevant version for executing the provided instruction without changes.

Example 8. The method of any one of the preceding Examples, wherein in response to determining that i) the token sequence corresponds to the rule and ii) the rule is inactive for the first version of the software application, the method further comprising:
  determining a clue annotation related to the rule in an inactive state for the first version of the software application;
  providing the clue annotation to provide further instructions for at least one of the group consisting of modification, replacement, and extension of the received instruction to define a new instruction that is executable at the first version of the software application.

Example 9. The method of any one of the preceding Examples, wherein in response to determining that the token sequence corresponds to the rule that is inactive, the method further comprises:
   determining a set of clue indications associated with the first version of the software application;
   determining that the rule corresponds to a clue indication from the set of clue indications; and
   providing further information indicative of a restriction associated with executing the instruction at the first version of the software application.
Example 10. The method of any one of the preceding Examples, wherein the restrictions are associated with user or product properties defined for one or more versions of the software application.
Example 11. The method of any one of the preceding Examples, the method further comprising:
   receiving an identification of a user associated with the received instructions;
   determining whether the rule that corresponds to the token sequence is associated with a clue indication that defines restrictions for executing the rule at the first version of the software application by the user; and
   providing information indicative of the restriction.

Support for Syntax Analysis During Processing Instructions for Execution

Example 1. A computer-implemented method comprising:
   defining rules for processing instructions at a syntax analyzer of an application, wherein the rules include hint metadata for evaluating validity statuses of instructions at different versions of the application;
   receiving an instruction including tokens at the syntax analyzer to determine whether a token sequence corresponds to a rule from the rules; and
   in response to determining that i) the token sequence corresponds to the rule and ii) the rule is inactive for a current version of the application associated with the syntax analyzer:
      determining a second version of the application that is associated with the corresponding rule as an active rule; and
      providing an indication of the second version of the application.
Example 2. The method of Example 1, wherein the second version of the application is associated with executable capabilities for executing a command defined based on the instruction.
Example 3. The method of Example 1 or 2, wherein instruction is provided as a string of symbols written in at least one format selected from the group consisting of a natural language, a programming language, and a data structure.
Example 4. The method of Example 3, wherein the instruction is a voice instruction received in an audio format, and
   wherein the method comprises:
      parsing the instructions based on voice recognition to identify the tokens within the voice instructions.
Example 5. The method of any one of the preceding Examples, wherein the provided indication further includes a notification that the received instruction is not executable at the current version due to a restriction defined for the instruction to be executed at the current version.
Example 6. The method of Example 5, wherein the restriction is associated with user or product properties defined for one or more versions of the application.
Example 7. The method of any one of the preceding Examples, wherein determining that the token sequence corresponds to the rule comprises determining that at least two tokens of the tokens define a group corresponding to the rule, wherein the at least two tokens are determined to define the group based on a predefined correlation rules for processing a sequence of tokens at the syntax analyzer.
Example 8. The method of any one of the preceding Examples, wherein the provided indication of the second version includes an annotation that includes at least one of i) information for limitations of executing the instruction at the current version of the application, ii) information how to redefine the instruction to provide a new instruction in an executable format for the current version of the application, and iii) an indication of the second version of the application as a relevant version for executing the instruction without changes.
Example 9. The method of any one of the preceding examples, wherein the information how to redefine the instruction to provide the new instruction in the executable format comprises:
   providing a clue annotation to perform at least one of redefining operation for the instructions from the group consisting of modification, replacement, and extension of the received instruction to define the new instruction that is executable at the current version of the application.
Example 10. The method of any one of the preceding Examples, the method further comprising: receiving an identification of a user associated with the received instructions;
   determining whether the rule that corresponds to the token sequence is associated with a clue indication that defines restrictions for executing the rule at the current version of the application by the user; and
   providing information indicative of the restriction.

What is claimed is:

1. A computer-implemented method comprising:
   obtaining rules for processing instructions at a syntax analyzer of an application, wherein the rules include hint metadata for evaluating validity statuses of instructions at multiple versions of the application;
   receiving an instruction including tokens at the syntax analyzer to determine whether a token sequence of the tokens corresponds to a rule from the rules, wherein the instruction includes an indication of a current version of the application being requested to execute a command based on the token sequence; and
   in response to determining that i) the token sequence corresponds to the rule and ii) the rule is associated with an inactive status for the current version of the application:
      determining a second version of the application that is associated with the rule, wherein the rule is associated with an active status for the second version of the application, wherein the second version of the application is different from the current version; and
      providing an indication of the second version of the application as a version of the application at which the token sequence is usable to execute the command.

2. The method of claim 1, wherein the second version of the application is associated with executable capabilities for executing a command defined based on the instruction.

3. The method of claim 1, wherein instruction is provided as a string of symbols written in at least one format selected from the group consisting of a natural language, a programming language, and a data structure.

4. The method of claim 3, wherein the instruction is a voice instruction received in an audio format, and
wherein the method comprises:
parsing the instructions based on voice recognition to identify the tokens within the voice instructions.

5. The method of claim 1, wherein the provided indication further includes a notification that the received instruction is not executable at the current version due to a restriction defined for the instruction to be executed at the current version.

6. The method of claim 5, wherein the restriction is associated with user or product properties defined for one or more versions of the application.

7. The method of claim 1, wherein determining that the token sequence corresponds to the rule comprises determining that at least two tokens of the tokens define a group corresponding to the rule, wherein the at least two tokens are determined to define the group based on a predefined correlation rules for processing a sequence of tokens at the syntax analyzer.

8. The method of claim 1, wherein the provided indication of the second version includes an annotation that includes at least one of i) information for limitations of executing the instruction at the current version of the application, ii) information how to redefine the instruction to provide a new instruction in an executable format for the current version of the application, and iii) an indication of the second version of the application as a relevant version for executing the instruction without changes.

9. The method of claim 8, wherein the information how to redefine the instruction to provide the new instruction in the executable format comprises:
providing a clue annotation to perform at least one of redefining operation for the instructions from the group consisting of modification, replacement, and extension of the received instruction to define the new instruction that is executable at the current version of the application.

10. The method of claim 1, the method further comprising:
receiving an identification of a user associated with the received instructions;
determining whether the rule that corresponds to the token sequence is associated with a clue indication that defines restrictions for executing the rule at the current version of the application by the user; and
providing information indicative of the restriction.

11. A non-transitory, computer-readable medium coupled to one or more processors and having instructions stored thereon which, when executed by the one or more processors, cause the one or more processors to perform operations, the operations comprising:
obtaining rules for processing instructions at a syntax analyzer of an application, wherein the rules include hint metadata for evaluating validity statuses of instructions at multiple versions of the application;
receiving an instruction including tokens at the syntax analyzer to determine whether a token sequence of the tokens corresponds to a rule from the rules, wherein the instruction includes an indication of a current version of the application being requested to execute a command based on the token sequence; and
in response to determining that i) the token sequence corresponds to the rule and ii) the rule is associated with an inactive status for the current version of the application:
determining a second version of the application that is associated with the rule, wherein the rule is associated with an active status for the second version of the application, wherein the second version of the application is different from the current version; and
providing an indication of the second version of the application as a version of the application at which the token sequence is usable to execute the command.

12. The computer-readable medium of claim 11, wherein the second version of the application is associated with executable capabilities for executing a command defined based on the instruction.

13. The computer-readable medium of claim 11, wherein instruction is provided as a string of symbols written in at least one format selected from the group consisting of a natural language, a programming language, and a data structure.

14. The computer-readable medium of claim 13, wherein the instruction is a voice instruction received in an audio format, and
wherein the computer-readable medium further stores instructions, which when executed by the one or more processors cause the one or more processors to perform operations comprising:
parsing the instructions based on voice recognition to identify the tokens within the voice instructions.

15. The computer-readable medium of claim 11, wherein the provided indication further includes a notification that the received instruction is not executable at the current version due to a restriction defined for the instruction to be executed at the current version.

16. The computer-readable medium of claim 15, wherein the restriction is associated with user or product properties defined for one or more versions of the application.

17. A system comprising:
a computing device; and
a computer-readable storage device coupled to the computing device and having instructions stored thereon which, when executed by the computing device, cause the computing device to perform operations, the operations comprising:
obtaining rules for processing instructions at a syntax analyzer of an application, wherein the rules include hint metadata for evaluating validity statuses of instructions at multiple versions of the application;
receiving an instruction including tokens at the syntax analyzer to determine whether a token sequence of the tokens corresponds to a rule from the rules, wherein the instruction includes an indication of a current version of the application being requested to execute a command based on the token sequence; and
in response to determining that i) the token sequence corresponds to the rule and ii) the rule is associated with an inactive status for the current version of the application:
determining a second version of the application that is associated with the rule, wherein the rule is associated with an active status for the second version of the application, wherein the second version of the application is different from the current version; and providing an indication of the second version of the application as a version of the application at which the token sequence is usable to execute the command.

18. The system of claim 17, wherein the second version of the application is associated with executable capabilities for executing a command defined based on the instruction.

19. The system of claim 17, wherein instruction is provided as a string of symbols written in at least one format selected from the group consisting of a natural language, a programming language, and a data structure.

20. The system of claim 17, wherein the instruction is a voice instruction received in an audio format, and wherein the computer-readable storage device further stores instructions, which when executed by the computing device cause the computing device to perform operations comprising:

parsing the instructions based on voice recognition to identify the tokens within the voice instructions.

\* \* \* \* \*